(12) United States Patent
Beristany et al.

(10) Patent No.: US 12,719,249 B2
(45) Date of Patent: Aug. 25, 2026

(54) FLOOR MOUNT STAND FOR ELECTRICAL BOXES

(71) Applicant: HUBBELL INCORPORATED, Shelton, CT (US)

(72) Inventors: Victor Beristany, South Bend, IN (US); Krzysztof Wojciech Korcz, Granger, IN (US); Krishna C. Patel, Granger, IN (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 18/240,977

(22) Filed: Aug. 31, 2023

(65) Prior Publication Data

US 2024/0079865 A1 Mar. 7, 2024

Related U.S. Application Data

(60) Provisional application No. 63/403,351, filed on Sep. 2, 2022.

(51) Int. Cl.
*H02G 3/12* (2006.01)
*H02G 3/08* (2006.01)

(52) U.S. Cl.
CPC ............. *H02G 3/125* (2013.01); *H02G 3/083* (2013.01); *H02G 3/126* (2013.01)

(58) Field of Classification Search
CPC ......... H02G 3/125; H02G 3/083; H02G 3/126
See application file for complete search history.

(56) References Cited

U.S. PATENT DOCUMENTS 982,841 A 1/1911 Maison
1,288,024 A 12/1918 Kendig
1,828,064 A 10/1931 Paine
1,982,957 A * 12/1934 Knell .................... H02G 3/126 220/3.9
2,990,172 A 6/1961 Gianotta
3,588,017 A 6/1971 O'Brien
4,135,337 A 1/1979 Medlin
5,098,046 A * 3/1992 Webb .................... H02G 3/128 220/3.9
5,224,673 A * 7/1993 Webb .................... H02G 3/128 220/3.9
5,448,011 A 9/1995 Laughlin
5,744,753 A 4/1998 Nattel
5,810,303 A 9/1998 Bourassa et al.
5,931,325 A 8/1999 Filipov
6,335,486 B1 1/2002 Reiker
6,765,146 B1 7/2004 Gerardo (Continued)

OTHER PUBLICATIONS

Eaton "B-Line Series: BB5-HF hands-free box bracket" Eaton Publication No. SA306029EN; Jan. 2019.

(Continued)

*Primary Examiner* — Monica E Millner
(74) *Attorney, Agent, or Firm* — Ruggiero McAllister & McMahon LLC

(57) ABSTRACT

A floor mount stand that is connectable to an electrical box includes a frame connectable to the electrical box to support the electrical box on a floor and a brace that is removably connected to the frame. The brace is connectable to the frame to extend to the adjacent vertical studs.

20 Claims, 9 Drawing Sheets

(56) References Cited

U.S. PATENT DOCUMENTS 6,871,827 B2 * 3/2005 Petak ........................ H02G 3/12 220/3.9
6,996,943 B2 * 2/2006 Denier ................... H02G 3/126 174/64
7,439,443 B2 * 10/2008 Dinh ...................... H02G 3/126 220/3.9
7,956,285 B2 * 6/2011 Tally ........................ H02G 1/00 174/53
8,328,150 B2 12/2012 Collins et al.
8,403,289 B1 * 3/2013 Rinderer ................ H02G 3/126 220/3.9
9,252,579 B2 * 2/2016 Korcz ...................... H02G 3/08
9,397,491 B2 * 7/2016 Birli ....................... H05K 7/183
9,595,819 B1 3/2017 Bonino
9,653,899 B2 * 5/2017 Salian ................... F16B 5/0016
10,958,053 B2 3/2021 Korcz et al.
11,248,740 B2 * 2/2022 Witherbee .............. H02G 3/126
11,473,721 B2 * 10/2022 Oh ....................... H02G 3/0456
11,585,486 B2 * 2/2023 Witherbee .............. H02G 3/125
12,114,456 B2 * 10/2024 Oh ......................... H02G 3/126
12,300,989 B2 5/2025 Beristany
2004/0061033 A1 4/2004 Nicolides
2005/0067546 A1 * 3/2005 Dinh ...................... H02G 3/125 220/3.9
2005/0176278 A1 8/2005 Cheatham et al.
2007/0187402 A1 8/2007 Dinh
2007/0194180 A1 8/2007 Korcz
2008/0020632 A1 * 1/2008 Gorman ................. H02G 3/128 439/535
2008/0093099 A1 4/2008 Webb
2008/0236859 A1 10/2008 de la Borbolla
2010/0006723 A1 * 1/2010 Yan ........................ H02G 3/125 248/201
2010/0108347 A1 5/2010 Korcz et al.
2010/0176138 A1 * 7/2010 Zacharevitz ............. H02G 1/00 220/737
2010/0270446 A1 * 10/2010 Phillips ................ H05K 5/0204 248/201
2012/0031640 A1 2/2012 Korcz et al.
2014/0103180 A1 * 4/2014 Birli ....................... H02G 3/125 248/274.1
2015/0333493 A1 11/2015 Jones
2016/0099555 A1 * 4/2016 Nikayin ................. H02G 3/126 248/65
2017/0093141 A1 3/2017 Jones
2017/0256928 A1 * 9/2017 Korcz .................... H02G 3/125
2018/0048134 A1 2/2018 Korcz
2018/0241187 A1 8/2018 Korcz et al.
2018/0241188 A1 8/2018 Korcz et al.
2019/0137031 A1 5/2019 Johnson
2019/0376643 A1 * 12/2019 Witherbee ................ H02G 3/10
2020/0194983 A1 6/2020 Korcz et al.
2020/0378553 A1 * 12/2020 Oh ........................... H02G 3/08
2021/0006055 A1 1/2021 Korcz et al.
2021/0041059 A1 * 2/2021 Witherbee ............ F16M 13/022
2021/0156512 A1 5/2021 Wilson et al.
2022/0278514 A1 9/2022 Korcz

OTHER PUBLICATIONS

Orbit Industries “Preassembled Ssb With Uma and 4S Deep Box With 10" Ground Pigtail”, Dec. 2021.
NVent Caddy “Box Mounting Plate with Far Side Support-TB45PK”, 2022.
Hubbell Ultimate G Series Sell Sheet dated Feb. 2024.
Orbit Kick Flat Bracket Family Feb. 2024.
Southwire Floor Mount Box Support, Mar. 2023.

* cited by examiner

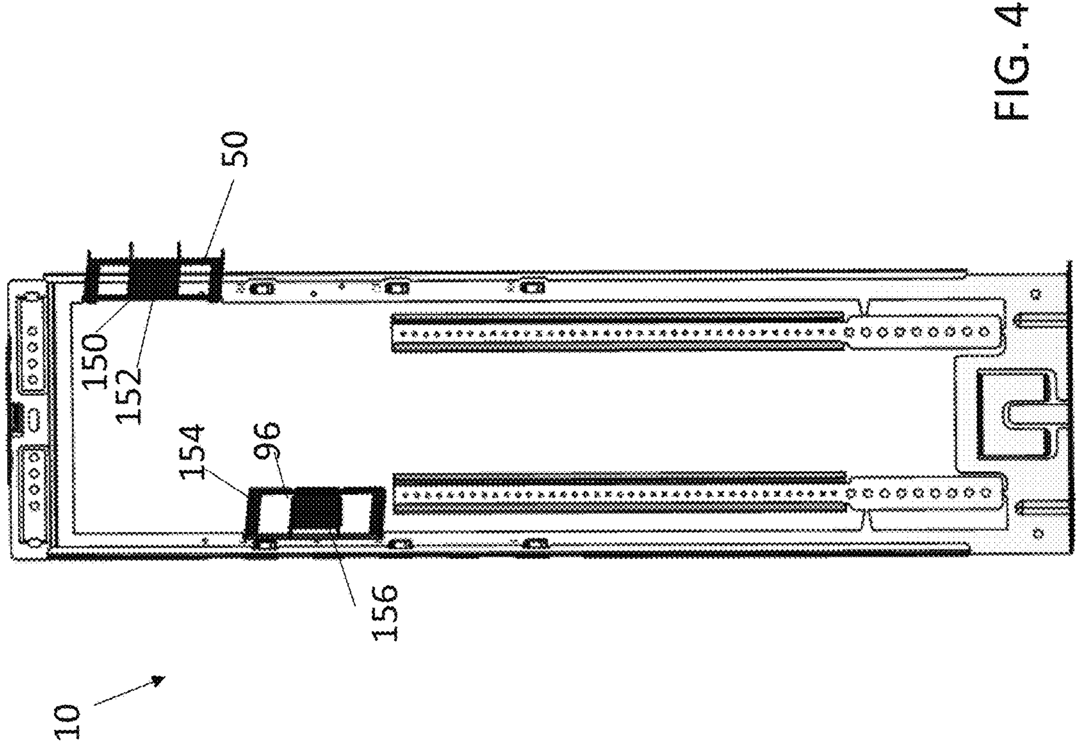
FIG. 4
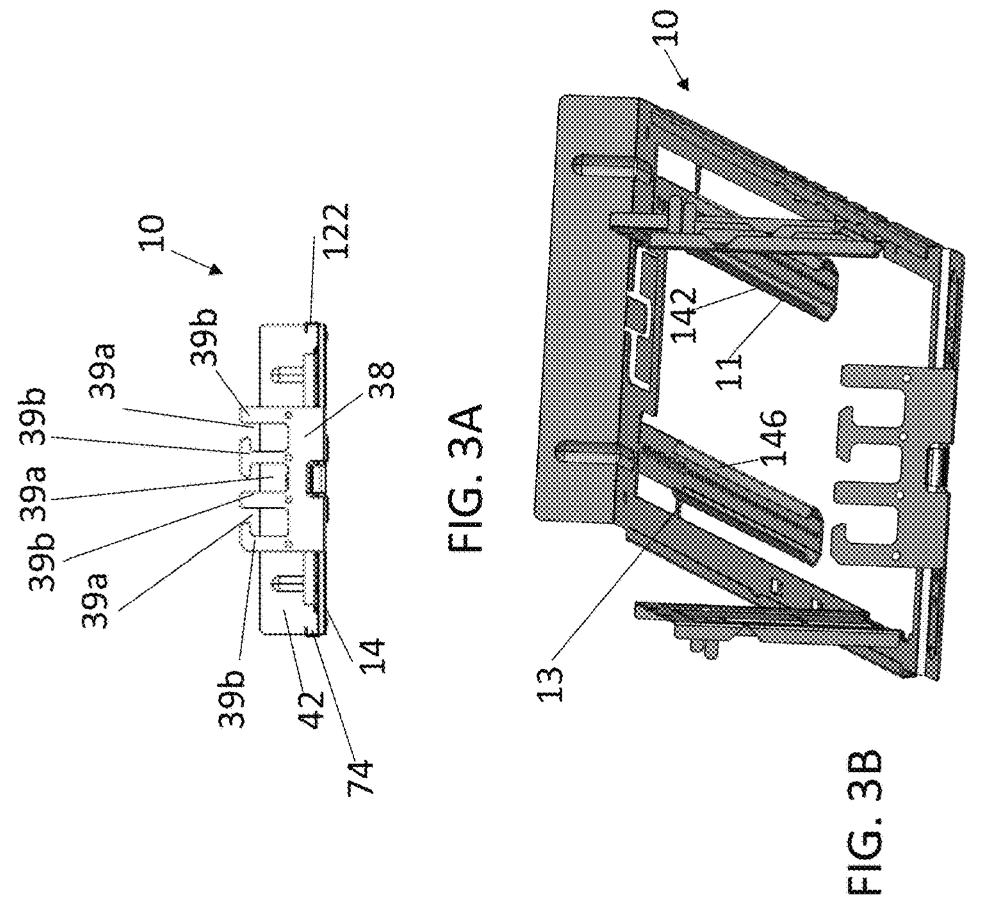
FIG. 3A
FIG. 3B 540
524
532
530
536
528
538
526
535
500
502
548
522

551
550
548
554
552
551
527
514
512
535
526
534
530
520
518
538
504
502
528
506
516
536
524
525
502
533
532
522
510
500
508
542
540
541
546
543
544

FLOOR MOUNT STAND FOR ELECTRICAL BOXES

CROSS REFERENCE TO RELATED APPLICATIONS

This application claims the benefit of U.S. Application 63/403,351, filed Sep. 2, 2022, the contents of which are incorporated by reference herein.

BACKGROUND

1. Field of the Invention

The present disclosure is related to mounts for electrical boxes. In particular, the present disclosure is related to a floor mount stand for electrical boxes.

2. Description of Related Art

Electrical boxes that enclose and support electrical devices, for example, outlets or switches, cables, and wiring are usually mounted on studs or brackets. A floor mount stand is mainly used to mount these electrical boxes in between the studs at a particular height. A common issue for this type of floor mount stand is that it can be attached to the floor, but it cannot be secured at the top. A solution to minimize the movement of the floor mount stand has been the use of far side support brackets; however, this undesirably limits the position of the electrical box connected to the floor mount stand.

Accordingly, it has been determined by the present disclosure that there is a continuing need for a device that overcomes, alleviates, and/or mitigates one or more of the aforementioned and other deleterious effects of prior devices.

SUMMARY

A floor mount stand that is connectable to an electrical box is provided that includes a frame connectable to the electrical box to support the electrical box on a floor and a brace that is removably connected to the frame. The brace is connectable to the frame to extend to the adjacent vertical studs.

In some embodiments either alone or together with any one or more of the aforementioned and/or after-mentioned embodiments, the brace has a length that is adjustable.

In some embodiments either alone or together with any one or more of the aforementioned and/or after-mentioned embodiments, the frame has a top member opposite a bottom member that are connected by a first side member and a second side member to surround an opening.

In some embodiments either alone or together with any one or more of the aforementioned and/or after-mentioned embodiments, the frame has a first foldable tab that is foldable outward in a first direction and formed in the top member with a first free end opposite a first end that is connected to the frame, wherein the frame has a second foldable tab the is foldable outward in a second direction that is opposite the first direction and formed in the top member with a second free end opposite a second end that is connected to the frame, and the first foldable tab and the second foldable tab are each connectable to one of the adjacent vertical studs to use the floor mount stand without using the brace.

In some embodiments either alone or together with any one or more of the aforementioned and/or after-mentioned embodiments, the frame has a middle tab that is bent outward from the top member to be on a first side of the floor mount stand.

In some embodiments either alone or together with any one or more of the aforementioned and/or after-mentioned embodiments, a cable support extends from the top member with a plurality of slots between a plurality of tabs to receive cables.

In some embodiments either alone or together with any one or more of the aforementioned and/or after-mentioned embodiments, the bottom member connects to a track, and the track is connected to the adjacent vertical studs.

In some embodiments either alone or together with any one or more of the aforementioned and/or after-mentioned embodiments, the first side member and the second side member each has a plurality of hooks at different heights.

In some embodiments either alone or together with any one or more of the aforementioned and/or after-mentioned embodiments, the first side member has a first fold with a first plurality of holes and the second side member has a second fold with a second plurality of holes.

In some embodiments either alone or together with any one or more of the aforementioned and/or after-mentioned embodiments, the brace is a brace assembly that has a first brace piece and second brace piece that are made of two channel type pieces.

In some embodiments either alone or together with any one or more of the aforementioned and/or after-mentioned embodiments, the first brace piece has a first side portion that is flat and a first slider portion that has a flat section and folds on opposite sides that are bent outwards and inwards to form a C-shape forming a first channel and the second brace piece has a second side portion that is flat and a second slider portion that has a flat section and folds on opposite sides that are bent outwards and inwards to form a C-shape forming a second channel that is smaller than the first channel.

In some embodiments either alone or together with any one or more of the aforementioned and/or after-mentioned embodiments, the floor mount stand is a flat plate that is cut and then a punch is applied to the first brace piece and the second brace piece to form the C-shape for each of the first slider portion and the second slider portion.

In some embodiments either alone or together with any one or more of the aforementioned and/or after-mentioned embodiments, the C-shape of each of the first slider portion and the second slider portion has a width in an open portion of the C-shape that is larger than a base portion of each of the first slider portion and the second slider portion allowing the punch to be withdrawn after forming the C-shape.

In some embodiments either alone or together with any one or more of the aforementioned and/or after-mentioned embodiments, the first side member and the second side member each has a support member, and each support member has a U-shaped member that extends into the opening and a bendable member that extends from a middle section of the U-shaped member so that each of the U-shaped members bend outward to a first depth and each of the bendable members bend outward further to a second depth that is greater than the first depth.

In some embodiments either alone or together with any one or more of the aforementioned and/or after-mentioned embodiments, a mounting plate is connectable to the electrical box and the frame, and the mounting plate has a plate body with a center opening through the plate body, a plurality of mounting holes and/or grooves through plate body, a plurality of tabs and a plurality of bent members extending from a first side and a second side opposite the first side of the plate body, and an extended portion extending from a third side between the first side and the second side.

In some embodiments either alone or together with any one or more of the aforementioned and/or after-mentioned embodiments, the second brace piece is inserted in the first brace piece allowing the first brace piece and the second brace piece to slide relative to one another as a brace assembly, and the first brace piece and the second brace piece to slide relative to one another to adjust a length of the brace assembly.

In some embodiments either alone or together with any one or more of the aforementioned and/or after-mentioned embodiments, the first side member has a first fold and the second side member has a second fold, the brace assembly is insertable between the middle tab extending from the top member, a first cutout in the first fold of the first side member, and a second cutout in the second fold of the second side member by a snap fit to hold the brace assembly against the top member of frame.

In some embodiments either alone or together with any one or more of the aforementioned and/or after-mentioned embodiments, the first brace piece has a first side portion that can be positioned on a first stud of the adjacent vertical studs and a first fastener passes through the first side portion and through the first stud to connect first brace piece to the first stud and the second brace piece has a second side portion that can be positioned on a second stud of the adjacent vertical studs and a second fastener passes through the second side portion and through the second stud to connect second brace piece to the second stud.

In some embodiments either alone or together with any one or more of the aforementioned and/or after-mentioned embodiments, the mounting plate fits in one or more of the plurality of hooks to maintain the mounting plate connected to the first side member and the second side member while a first fastener passes through the mounting plate and the first side member and a second fastener passes through the mounting plate and the second side member connecting the mounting plate to the frame.

In some embodiments either alone or together with any one or more of the aforementioned and/or after-mentioned embodiments, the mounting plate is a first mounting plate that is connected to the electrical box that is a first electrical box, the frame is connectable to a second mounting plate so that the first mounting plate and the second mounting plate are connected to the frame in a side-by-side configuration, and the second mounting plate is connected to a second electrical box so that the second electrical box is rotated 90 degrees relative to the second mounting plate as compared to the first mounting plate that is connected to the first electrical box.

In some embodiments either alone or together with any one or more of the aforementioned and/or after-mentioned embodiments, to connect the second mounting plate to the first side member or the second side member, each of a plurality of bent members of the second mounting plate is inserted into one of the plurality of holes through the first fold of the first side member or one of the plurality of holes through second fold of second side member and a fastener is inserted through the second mounting plate and the first side member or the second side member.

The above-described and other features and advantages of the present disclosure will be appreciated and understood by those skilled in the art from the following detailed description, drawings, and appended claims.

DESCRIPTION OF THE DRAWINGS

FIG. 3A is a top view of FIG. 1.

FIG. 3B is a top perspective view of FIG. 1 having support members in a use position.

FIG. 4 is a rear perspective view of FIG. 1 having the support members in the use position.

DETAILED DESCRIPTION

Figures 1, 2A, 2B:
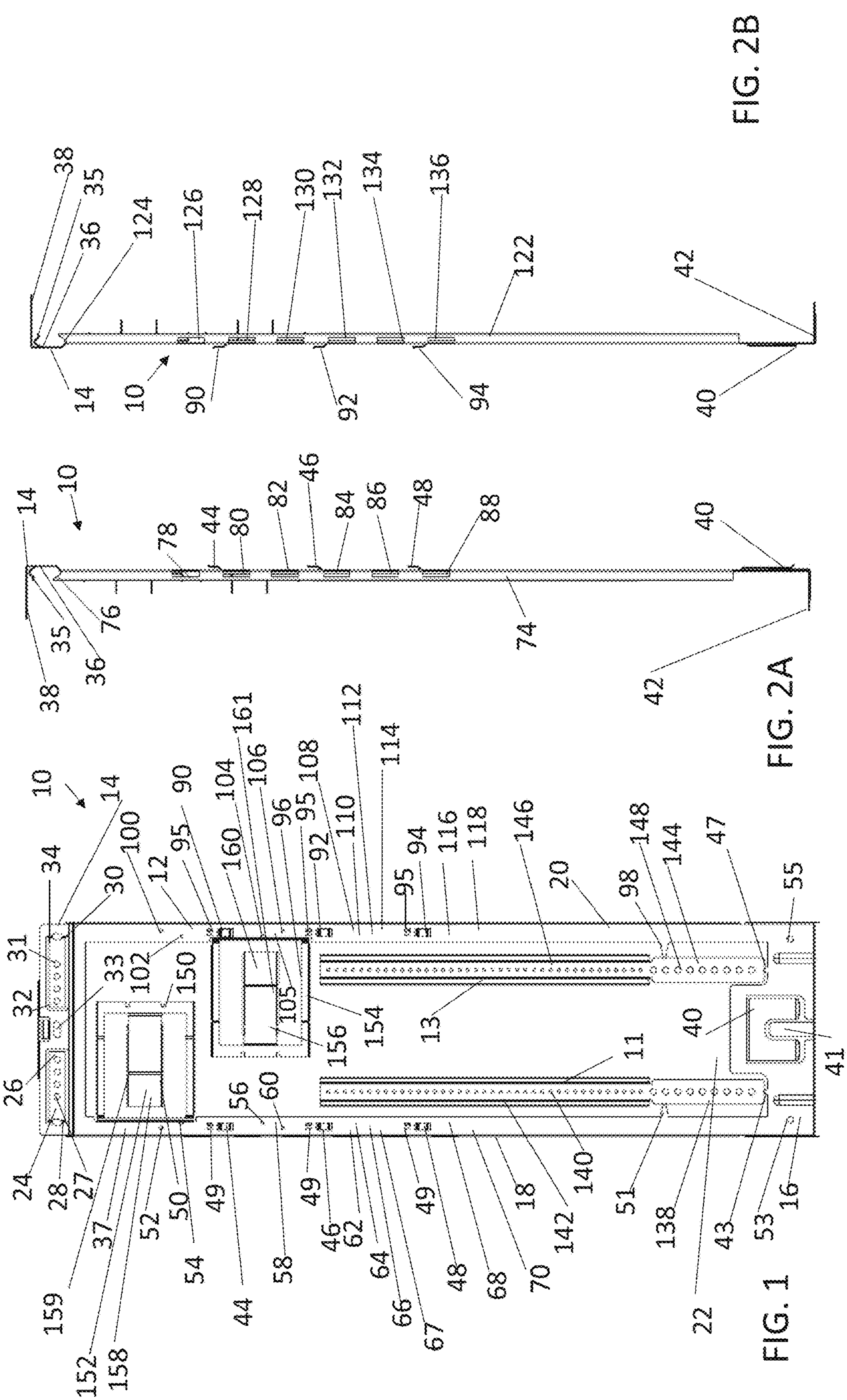
FIG. 1 is a front view of a floor mount stand according to the present disclosure.
FIG. 2A is a left side view of FIG. 1.
FIG. 2B is a right side view of FIG. 1.

Referring to the drawings and in particular to FIG. 1, an exemplary embodiment of a floor mount stand according to the present disclosure is shown and is generally referred to by reference numeral 10. Advantageously, floor mount stand 10 comes with a break away adjustable brace. This brace snaps in position at the top of floor mount stand 10 and it is fully adjustable. The brace is able to extend to the adjacent vertical studs allowing it to fully secure the assembly and stop the movement. The integrated adjustable brace is made out of two channel type pieces, namely, first brace piece 11 and second brace piece 13. The smaller channel of second brace piece 13 gets inserted in the outer channel of first brace piece 11 having as a result a very strong adjustable assembly. The fact that the brace snaps in position at the top of floor mount stand 10, makes it a hands free installation.

Referring to FIG. 1, floor mount stand 10 has a frame 12 formed of a top member 14 opposite a bottom member 16 that are connected by a first side member 18 and a second side member 20. Frame 12 surrounds an opening 22. Frame 12 has a first foldable tab 24 formed in top member 14. First foldable tab 24 has a free end 26 opposite an end 28 that is connected to a remainder of frame 12. Holes 27 are through first foldable tab 24. First foldable tab 24 is foldable outward in a first direction. Frame 12 has a second foldable tab 30 formed in top member 14. Second foldable tab 30 has a free end 32 opposite an end 34 that is connected to a remainder of frame 12. Holes 31 are through second foldable tab 30. Second foldable tab 30 is foldable outward in a second direction that is opposite the first direction. Frame 12 has an aperture 33 through top member 14. As shown in FIG. 2A, frame 12 has a middle tab 35 that is bent outward to be on a first side 36 of floor mount stand 10. A cable support 38 extends from top member 14. As shown in FIG. 3A, cable support 38 has slots 39*a* between tabs 39*b* to receive cables.

Referring back to FIG. 1, frame 12 has an upside-down U-shape flap 40 formed in bottom member 16. Frame 12 has a foldable strip 41 formed in bottom member 16 that has a free end that extends into upside-down U-shape flap 40 and a connected end opposite the free end that is connected to bottom member 16. A breakable member 43 extends into opening 22 from bottom member 16 and is connected to first brace piece 11. A breakable member 47 extends into opening 22 from bottom member 16 and is connected to a second brace piece 13. Frame 12 has holes 53, 55 through bottom member 16. As shown in FIG. 2A, frame 12 has a track support 42 that is connected bottom member 16 and is folded outward to be on first side 36 of floor mount stand 10.

Referring back to FIG. 1, frame 12 has a first hook 44 at a first height, a second hook 46 at a second height that is lower than the first height, and a third hook 48 at a third height that is lower than the second height extending from first side member 18. First side member 18 has indicia 49 that indicate a height of each of first hook 44, second hook 46 and third hook 48. A first support member 50 extends from first side member 18 into opening 22. A breakable member 51 extends into opening 22 from first side member 18 and is connected to a first brace piece 11. Holes 52, 54, 56, 58, 60, 62, 64, 66, 67, 68, 70, are through first side member 18. As shown in FIG. 2A, a first fold 74 extends from first side member 18 to first side 36 of floor mount stand 10. First fold 74 has a first cutout 76 adjacent top member 14. Frame 12 has holes 78, 80, 82, 84, 86, 88 through first fold 74. As shown in FIG. 3A, first fold 74 has a J-shape.

Referring back to FIG. 1, frame 12 has a fourth hook 90 at the first height, a fifth hook 92 at the second height, and a sixth hook 94 at the third height extending from a second side member 20 outward from a second surface 37 of frame 12. Second side member 20 has indicia 95 that indicate a height of each of fourth hook 90, fifth hook 92 and sixth hook 94. A second support member 96 extends from second side member 20 into opening 22. A breakable member 98 extends into opening 22 from second side member 20 and is connected to second brace piece 13. Holes 100, 102, 104, 105, 106, 108, 110, 112, 114, 116, 118 are through second side member 20. As shown in FIG. 2B, a second fold 122 extends from second side member 20 to first side 36 of floor mount stand 10. Second fold 122 has a second cutout 124 adjacent top member 14. Frame 12 has holes 126, 128, 130, 132, 134, 136 through second fold 122. As shown in FIG. 3, second fold 122 has a J-shape.

First brace piece 11 and second brace piece 13 are made out of two channel type pieces. First brace piece 11 has a side portion 138 that is flat and a slider portion 142 that has a flat section and folds on opposite sides that are bent outwards and inwards to form a C-shape forming a first channel. First brace piece 11 has holes 140 through side portion 138 and slider portion 142. Second brace piece 13 has a side portion 144 that is flat and a slider portion 146 that has a flat section and folds on opposite sides that are bent outwards and inwards to form a C-shape forming a second channel that is smaller than the first channel. Second brace piece 13 has holes 148 through side portion 144 and slider portion 146.

Referring to FIG. 3B, floor mount stand 10 can be manufactured by a flat plate that is cut, and, then, a punch is applied to first brace piece 11 and second brace piece 13 to form a C-shape for each of slider portion 142 of first brace piece 11 and slider portion 146 of second brace piece 13. The C-shape of slider portion 142 of first brace piece 11 and slider portion 146 of second brace piece 13 has a width in the open portion of the C-shape that is larger than a base portion of each of slider portion 142 of first brace piece 11 and slider portion 146 of second brace piece 13 having holes 140 and holes 148, respectively, allowing the punch to be withdrawn after forming the C-shape. Cutting the flat plate so that all parts of floor mount stand 10 are connected and the C-shape of slider portion 142 of first brace piece 11 and slider portion 146 of second brace piece 13 has a width in the open portion of the C-shape that is larger than the portion of each of slider portion 142 of first brace piece 11 and slider portion 146 of second brace piece 13 having holes 140 and holes 148, respectively, allows for easier tooling and does not waste material.

Referring back to FIG. 1, first support member 50 has a U-shaped member 150 that extends into opening 22 and a bendable member 152 that extends toward first side member 18 from a middle section of U-shaped member 150. Second support member 96 has a U-shaped member 154 that extends into opening 22 and a bendable member 156 that extends toward second side member 20 from a middle section of U-shaped member 154. Referring to FIG. 4, U-shaped member 150 of first support member 50 and U-shaped member 154 of second support member 96 bend outward from first side 36 of frame 12 to a first depth. Bendable member 152 of first support member 50 and bendable member 156 of second support member 96 can bend outward further away from first side 36 of frame 12 to a second depth that is greater than the first depth. As shown in FIG. 1, bendable member 152 of first support member 50 has a first segment 158 and bendable member 156 of second support member 96 has a second segment 160. First segment 158 can be bent along line 159 so that bendable member 152 has a third depth that is less than the second depth but greater than the first depth. Similarly, second segment 160 can be bent along line 161 so that bendable member 156 has the third depth. Bending first segment 158 and second segment 160 of bendable members 152 and 156 adds strength to bendable members 152 and 156, respectively. The first depth, for example, is 2.5 inches, the second depth, for example, is 6 inches, and the third depth, for example, is 5 inches.

Figures 5, 6:
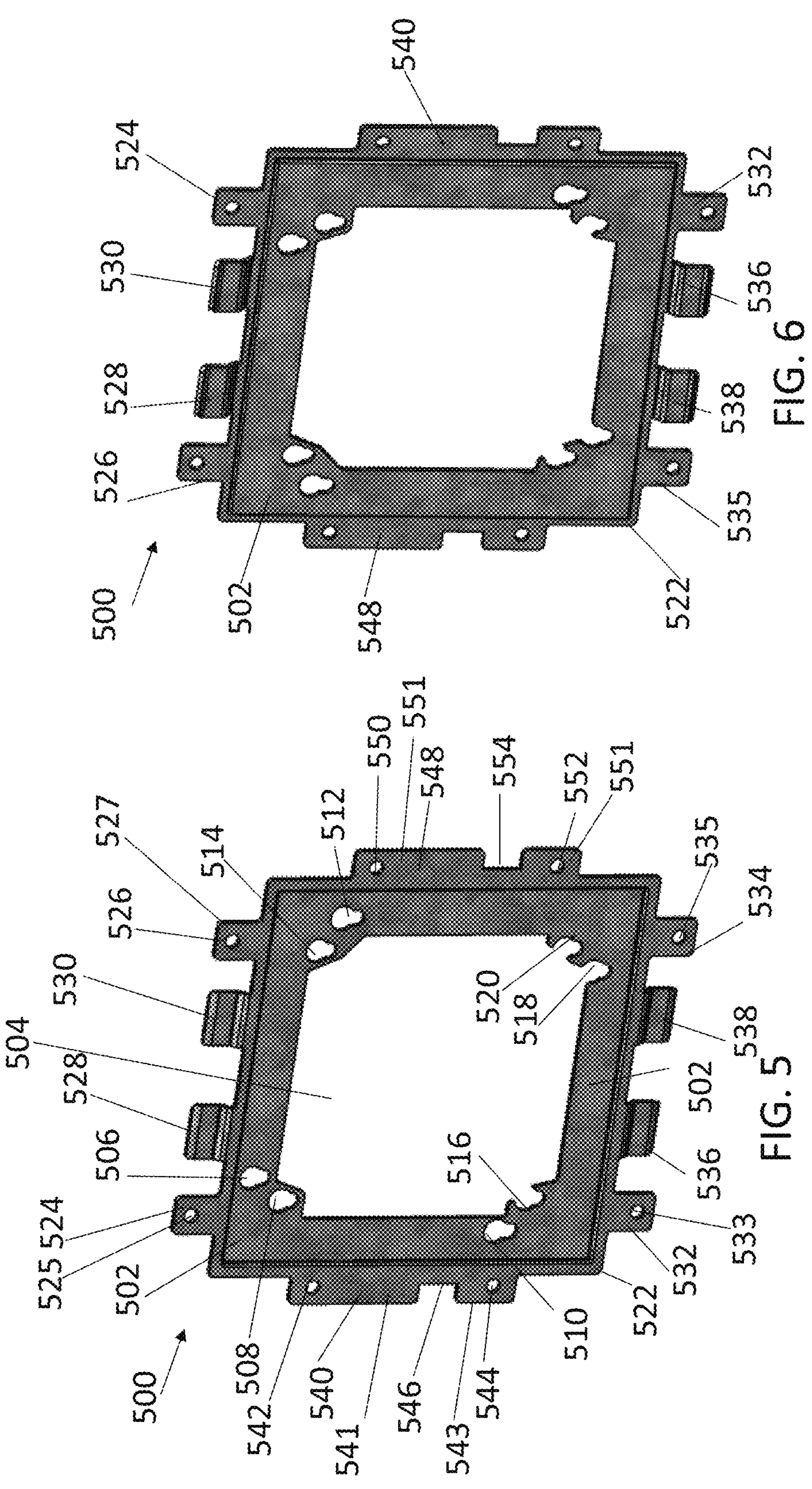
FIG. 5 is a front perspective view of a mounting plate that is connectable to the floor mount stand of FIG. 1.
FIG. 6 is a rear perspective view of FIG. 5.

Referring to FIGS. 5 and 6, a mounting plate 500 is connectable to floor mount stand 10. Mounting plate 500 has a plate body 502. A center opening 504 is through plate body 502. Mounting holes 506, 508, 510, 512, 514 are through plate body 502. Mounting grooves 516, 518, 520 are formed in plate body 502. Mounting holes 506, 508, 510, 512, 514 and mounting grooves 516, 518, 520 receive fasteners, for example, screws, to connect mounting plate 500 to electrical boxes of various sizes and/or a mud ring of various sizes. Mounting plate 500 forms a ridge 522 around plate body 502. Mounting plate 500 has tabs 524, 526 extending from a first side and bent members 528, 530 between tabs 524, 526. Tabs 524, 526 each have a hole 525, 527, respectively. Bent members 528, 530 are bent outward and away from plate body 502. Mounting plate 500 has tabs 532, 534 extending from a second side that is opposite the first side and bent members 536, 538 between tabs 532, 534. Tabs 532, 534 each have a hole 533, 535, respectively. Bent members 536, 538 are bent outward and away from plate body 502. Mounting plate 500 has an extended portion 540 extending from a third side between the first side and the second side. Extended portion 540 has holes 542, 544 and a cutout 546. Extended portion 540 has a first portion 541 above cutout 546 and a second portion 543 below cutout 546. Mounting plate 500 has an extended portion 548 extending from a fourth side between opposite the third side. Extended portion 548 has holes 550, 552 and a cutout 554. Extended portion 548 has a first portion 551 above cutout 554 and a second portion 551 below cutout 554.

Figure 7:
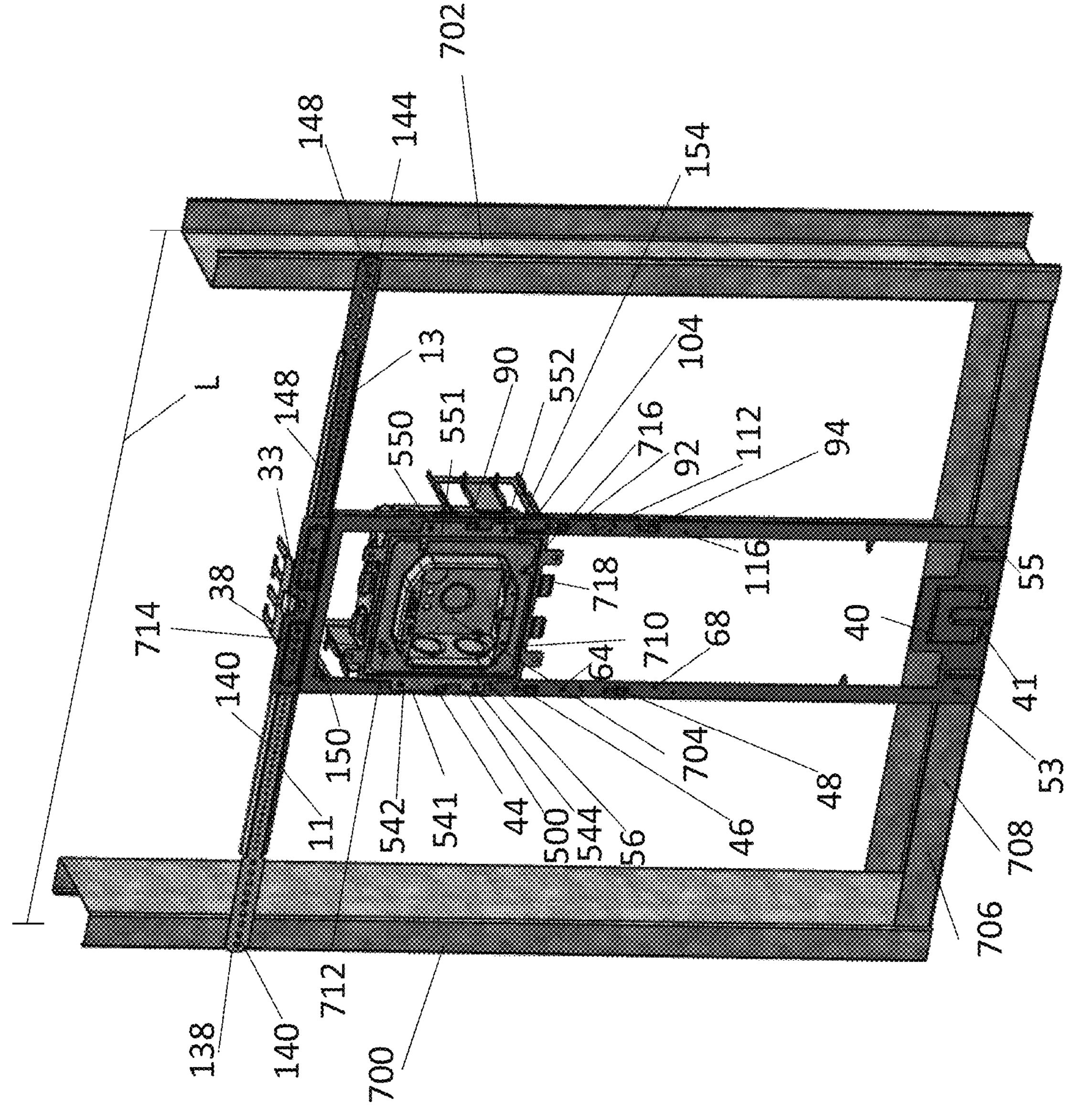
FIG. 7 is a front perspective view of the floor mount stand of FIG. 1 connected between two studs and a track, the mounting plate of FIG. 5 being connected to the floor mount stand of FIG. 1 in a first position, and the mounting plate of FIG. 5 being connected to an electrical box.
Figure 8:
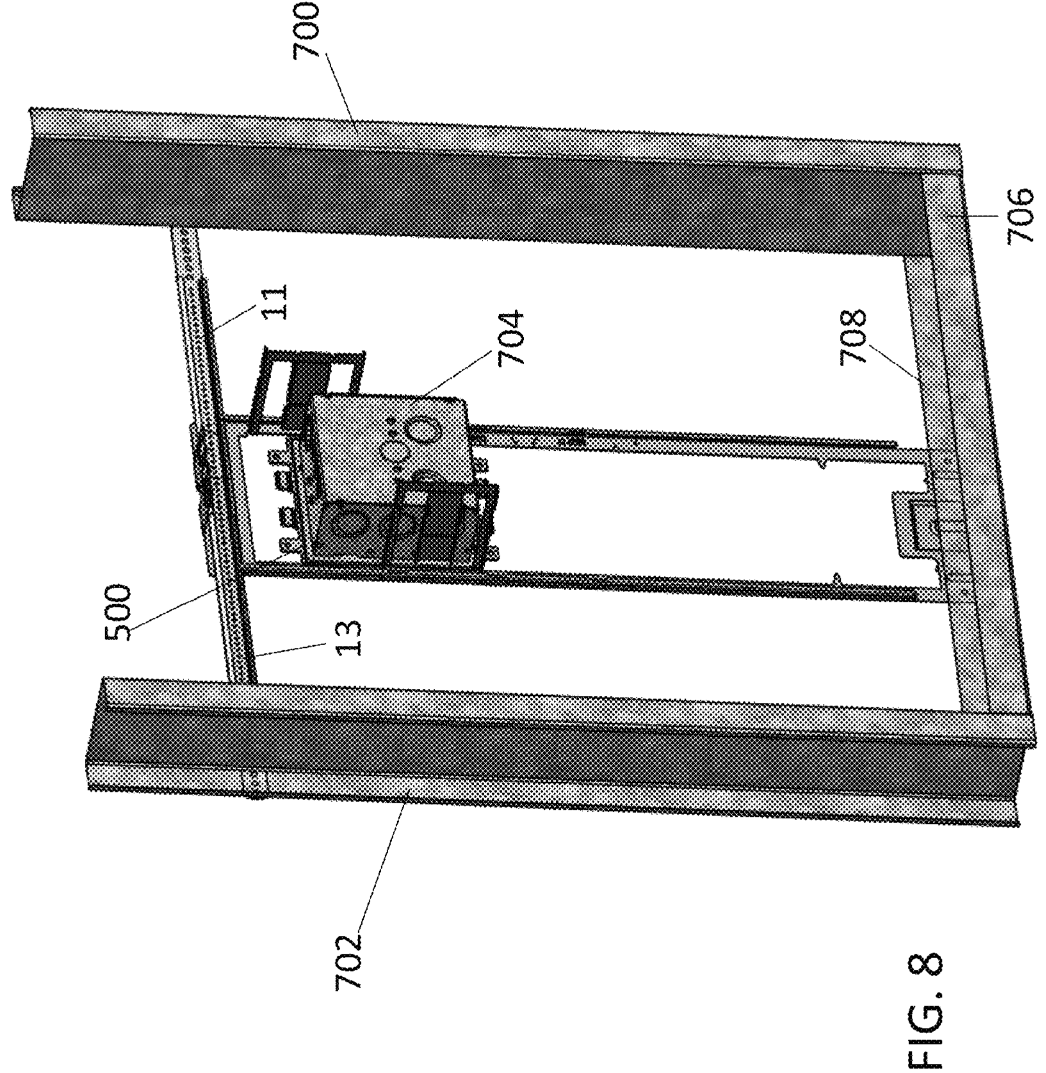
FIG. 8 is a rear perspective view of FIG. 7.

Referring to FIG. 1, a user breaks breakable member 43 and breakable member 51 to disconnect first brace piece 11 from a remainder of floor mount stand 10 and breaks breakable member 47 and breakable member 98 to disconnect second brace piece 13 from a remainder of floor mount stand 10. Referring to FIG. 7, second brace piece 13 is inserted in first brace piece 11 allowing first brace piece 11 and second brace piece 13 to slide relative to one another as a brace assembly. Accordingly, the smaller channel of second brace piece 13 gets inserted in the outer channel of first brace piece 11 having as a result a very strong adjustable brace assembly. Referring to FIGS. 7 and 8, first brace piece 11 and second brace piece 13 are able to extend to the adjacent vertical studs 700, 702, respectively, allowing floor mount stand 10 to fully secure mounting plate 500 that is connected to an electrical box 704 to the adjacent vertical studs 700, 702 and track 706 to stop movement.

Figure 9:
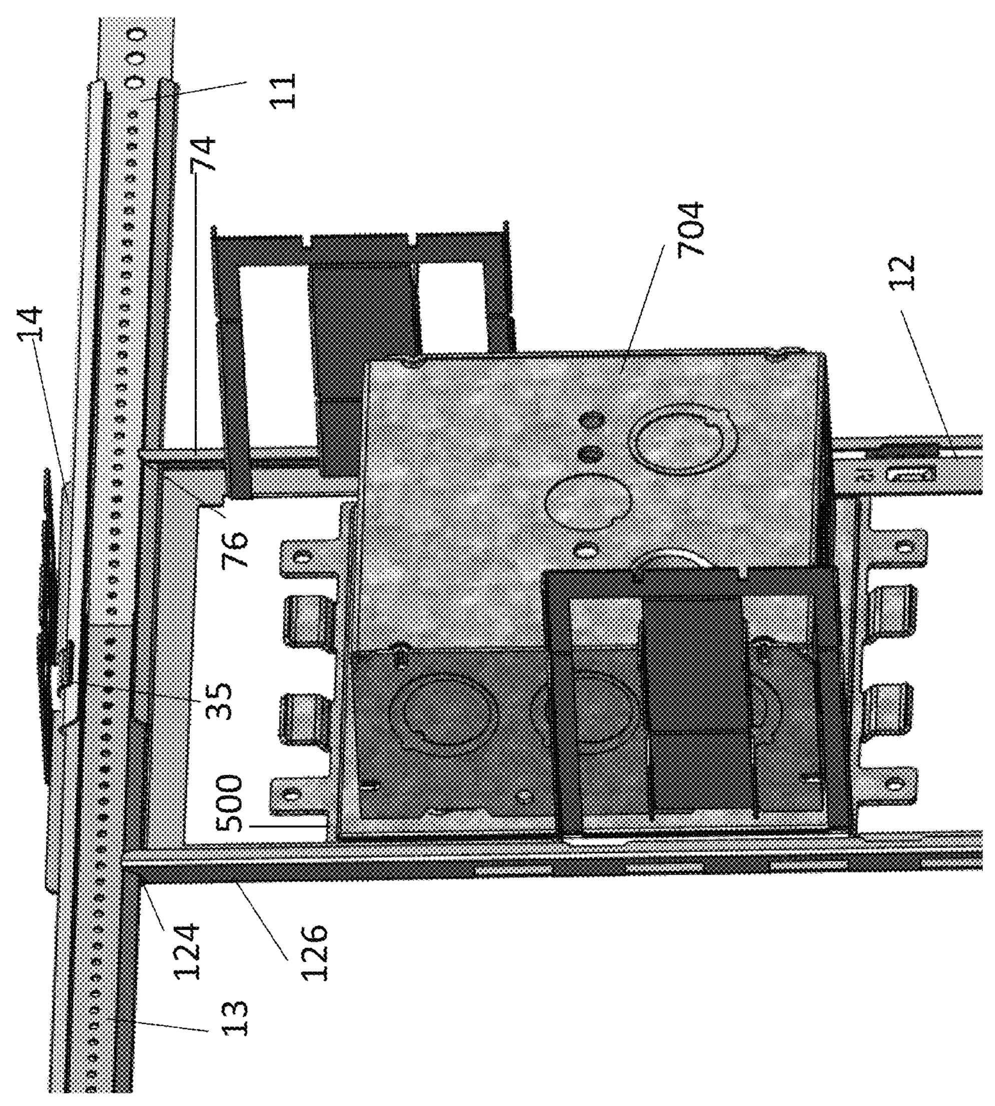
FIG. 9 is a partial rear perspective view of FIG. 7.

Referring to FIG. 9, the brace assembly of second brace piece 13 that is inserted in first brace piece 11 is inserted between middle tab 35, cutout 76 of first fold 74, and cutout 124 of second fold 122 by snap fit to hold the brace assembly of second brace piece 13 and first brace piece 11 against top member 14 of frame 12. Referring to FIG. 7, the brace assembly of second brace piece 13 that is inserted in first brace piece 11 has a length L that is adjustable. Depending on the distance between adjacent vertical studs 700, 702 and the desired position of floor mount stand 10, first brace piece 11 and second brace piece 13 are slid relative to one another to have a desired length L. Referring back to FIG. 9, depending on length L, first brace piece 11 and/or second brace piece 13 fits in cutout 76 of first fold 74, first brace piece 11 and/or second brace piece 13 fits adjacent middle tab 35, and first brace piece 11 and/or second brace piece 13 fits in cutout 124 of second fold 122. For the length shown in FIG. 9, first brace piece 11 is in cutout 76 of first fold 74, second brace piece 13 is in cutout 124 of second fold 122 and both first brace piece 11 and second brace piece 13 are adjacent middle tab 35. Referring to FIG. 7, a fastener, for example, a screw, can pass through aperture 33 through top member 14 and holes 140 and/or 148 of first brace piece 11 and/or second brace piece 13 to maintain a position of top member 14 relative to first brace piece 11 and/or second brace piece 13. Accordingly, the brace assembly snaps in position at the top of floor mount stand 10 allowing for a hands free installation when the fastener is inserted through first brace piece 11 and stud 700 and the fastener is inserted through second brace piece 13 and stud 702. First cutout 76 is shaped complementary to the cross section of first brace piece 11 and second cutout 124 is shaped complementary to the cross section of second brace piece 13 so that when the fastener is inserted through first brace piece 11 and stud 700 and the fastener is inserted through second brace piece 13 and stud 702, the brace assembly of second brace piece 13 that is inserted in first brace piece 11 stays in place between first fold 74, second fold 122 and middle tab 35.

Still referring to FIG. 7, side portion 138 of first brace piece 11 is positioned on stud 700 and a fastener, for example, a screw, can pass through another of holes 140 in side portion 138 and through stud 700 to connect first brace piece 11 to stud 700. Side portion 144 of second brace piece 13 is positioned on stud 702 and a fastener, for example, a screw, can pass through one of holes 148 in side portion 144 and through stud 702 to connect second brace piece 13 to stud 702. To connect bottom member 16 of frame 12 to an outside surface of track 706, track support 42 passes under track 706 and a fastener, for example, a screw, can pass through hole 53 and track 706 and another fastener can pass through hole 55 and track 706 to connect bottom member 16 of frame 12 to track 706. Foldable strip 41 is folded downward away from second surface 37 of frame 12 and can be placed under sheet rock to indicate a position of an electrical box that is connected to floor mount stand 10. Alternatively, to connect bottom member 16 of frame 12 to an inside surface of track 706, a sidewall 708 of a U-shape of track 706 fits between U-shape flap 40 and bottom member 16 and a fastener, for example, a screw, can pass through hole 53 and track 706 and another fastener can pass through hole 55 and track 706 to connect bottom member 16 of frame 12 to track 706. Another alternative is that bottom member 16 connects or rests on the floor. U-shaped member 150 of first support member 50 and U-shaped member 154 of second support member 96 are bent outward from first side 36 of frame 12 to the first depth, the second depth or the third depth to be positioned against sheet rock providing support. Cable support 38 extends over the brace assembly of second brace piece 13 that is inserted in first brace piece 11 to receive cables in slots 39*a* between tabs 39*b*.

Still referring to FIG. 7, mounting plate 500 connects to electrical box 704 by one or more fasteners, for example, screws, that each pass through electrical box 704 and one of mounting holes 506, 508, 510, 512, 514 and/or mounting grooves 516, 518, 520. A mud ring 710 is also connectable to mounting plate 500 by one or more fasteners, for example, screws, that each pass through mud ring 710 and one of mounting holes 506, 508, 510, 512, 514 and/or mounting grooves 516, 518, 520. As shown in FIG. 7 a screw 712 is passed through mounting hole 508 and a hole 714 in mud ring 710 and another screw 716 pass through groove 518 and a hole 718 in mud ring 710. First portion 541 of mounting plate 500 fits in first hook 44 and first portion 551 of extended portion 548 fits in fourth hook 90 so that a fastener for example, a screw, passes through hole 542 of mounting plate 500 and hole 54 of first side member 18 and, a fastener, for example, a screw, passes through hole 544 of mounting plate 500 and hole 56 of first side member 18 and a fastener, for example, a screw, passes through hole 550 of mounting plate 500 and hole 102 of second side member 20, and a fastener, for example, a screw, passes through hole 552 of mounting plate 500 and hole 104 of second side member 20 to connect electrical box 704 at a top height. Alternatively, first portion 541 of mounting plate 500 fits in second hook 46 and first portion 551 of mounting plate 500 fits in fifth hook 92 and so that a fastener for example, a screw, passes through hole 542 of mounting plate 500 and a hole of first side member 18 and, a fastener, for example, a screw, passes through hole 542 of mounting plate 500 and a hole of first side member 18 and a fastener, for example, a screw, passes through hole 550 of mounting plate 500 and a hole of second side member 20, and a fastener, for example, a screw, passes through hole 552 of mounting plate 500 and a hole of second side member 20 to connect electrical box 704 at a middle height that is lower than the top height. Another alternative is that first portion 541 of mounting plate 500 fits in third hook 48 and first portion 551 of mounting plate 500 fits in sixth hook 94 and a fastener for example, a screw, passes through hole 542 of mounting plate 500 and a hole of first side member 18 and, a fastener, for example, a screw, passes through hole 542 of mounting plate 500 and a hole of first side member 18 and a fastener, for example, a screw, passes through hole 550 of mounting plate 500 and a hole of second side member 20, and a fastener, for example, a screw, passes through hole 552 of mounting plate 500 and a hole of second side member 20 to connect electrical box 704 at a bottom height that is lower than the top height and the middle height. Floor mount stand 10 can be modified to have hooks and holes at different heights to connect mounting plate 500 at other heights. Sheet rock can be placed on opposite sides of adjacent studs 700, 702.

Figure 10:
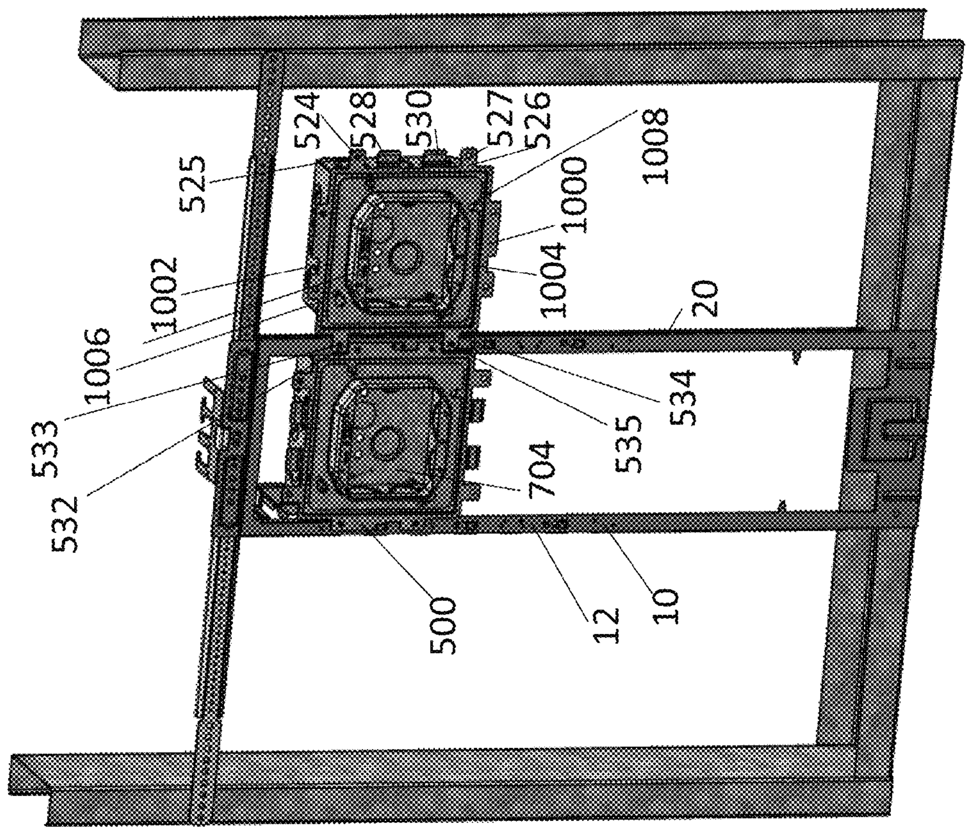
FIG. 10 is a front perspective view of the floor mount stand of FIG. 1 connected between the two studs and the track, the mounting plate of FIG. 5 is a first mounting plate that is connected to the floor mount stand of FIG. 1 in the first position, the first mounting plate is connected to the electrical box that is a first electrical box, a second mounting plate that is the same as the first mounting plate is connected to a second electrical box that is the same as the first electrical box, and the second mounting plate is connected to the floor mount stand in a side-by-side configuration with the first mounting plate.

Referring to FIG. 10, a second mounting plate 1000 is connectable to frame 12 of floor mount stand 10 in a side-by-side configuration with mounting plate 500. Mounting plate 1000 is the same as mounting plate 500 and is connected to a second electrical box 1002 that is the same as electrical box 704. Accordingly, the same reference numerals will be used for the same features. Mounting plate 1000 is connected to second electrical box 1002 so that second electrical box 1002 is rotated 90 degrees relative to mounting plate 1000 as compared to mounting plate 500 that is connected to electrical box 704. Mounting plate 1000 is connected to second electrical box 1002 by one or more fasteners, for example, screws, that each pass through second electrical box 1002 and one of mounting holes 506, 508, 510, 512, 514 and/or mounting grooves 516, 518, 520 of mounting plate 1000. Mounting plate 1000 is connected to a second mud ring 1004 so that mounting plate 1000 is rotated 90 degrees relative to second mud ring 1004 as compared to mounting plate 500 connected to mud ring 710. Mounting plate 1000 is connected to a second mud ring 1004 by a fastener, for example, a screw, that passes through a hole 1006 of second mud ring 1004 and either groove 510 or hole 512 of mounting plate 1000, and a fastener, for example, a screw, that passes through a groove 1008 of second mud ring 1004 and either hole 510 or hole 512 depending on the orientation of second mud ring 1004 relative to mounting plate 1000. The configuration shown in FIG. 10, mounting plate 1000 is connected to second mud ring 1004 by the fastener that passes through hole 1006 of second mud ring 1004 and hole 510 of mounting plate 1000 and the fastener that passes through hole 1008 of second mud ring 1004 and hole 512.

Figure 11:
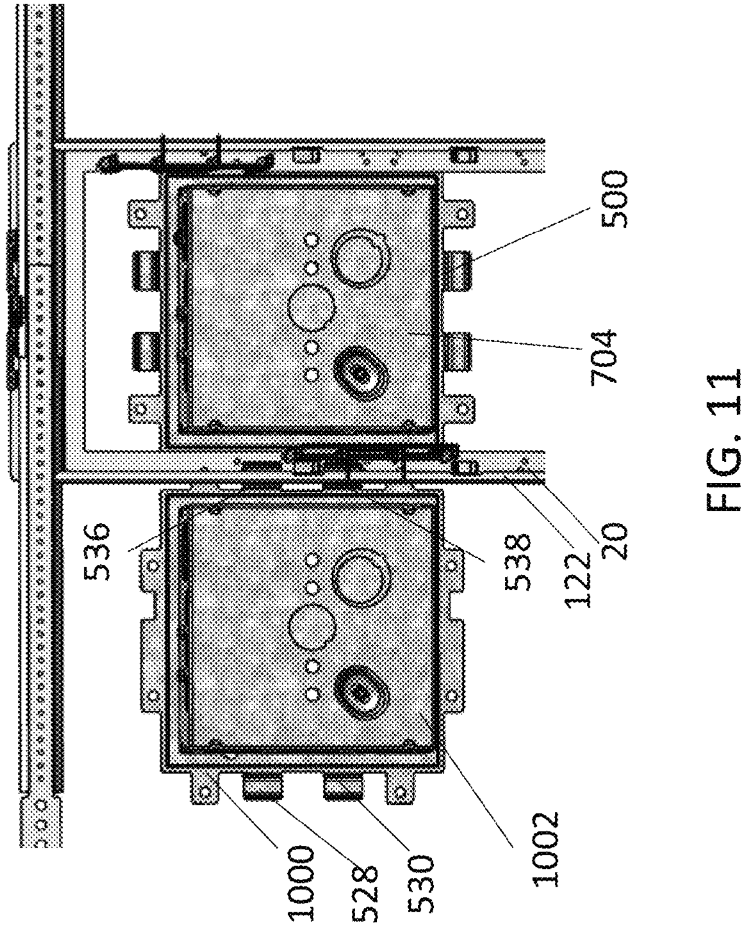
FIG. 11 is a partial rear perspective view of FIG. 10.

Referring to FIG. 11, to connect mounting plate 1000 to second side member 20 of floor mount stand 10 at the top height, bent member 536 is inserted into hole 126 through second fold 122 of second side member 20 and bent member 538 is inserted into hole 128 through second fold 122 of second side member 20. Alternatively, bent member 530 is inserted into hole 126 through second fold 122 of second side member 20 and bent member 528 is inserted into hole 128 through second fold 122 of second side member 20. Referring to FIG. 10, mounting plate 1000 is connected to second side member 20 of floor mount stand 10 by a fastener, for example, a screw, that passes through hole 533 of tab 532 and hole 100 through side member 20 and a fastener, for example, a screw, that passes through hole 535 of tab 534 and hole 106 through second side member 20 as shown in FIG. 10. Alternatively, mounting plate 1000 is connected to second side member 20 of floor mount stand 10 by a fastener, for example, a screw, that passes through hole 527 of tab 526 and hole 100 through side member 20 and a fastener, for example, a screw, that passes through hole 525 of tab 524 and hole 106 through side member 20.

Mounting plate 1000 can be connected to frame 12 of floor mount stand 10 in the side-by-side configuration with mounting plate 500 at the middle height. Bent member 536 is inserted into hole 130 through second fold 122 of second side member 20 and bent member 538 is inserted into hole 132 through second fold 122 of second side member 20. Alternatively, bent member 530 is inserted into hole 130 through second fold 122 of second side member 20 and bent member 528 is inserted into hole 132 through second fold 122 of second side member 20. Referring back to FIG. 10, mounting plate 1000 is connected to second side member 20 of floor mount stand 10 by a fastener, for example, a screw, that passes through hole 533 of tab 532 and a hole through side member 20 and a fastener, for example, a screw, that passes through hole 535 of tab 534 and a hole through second side member 20. Alternatively, mounting plate 1000 is connected to second side member 20 of floor mount stand 10 by a fastener, for example, a screw, that passes through hole 527 of tab 526 and a hole through side member 20 and a fastener, for example, a screw, that passes through hole 525 of tab 524 and a hole through side member 20.

Mounting plate 1000 can be connected to frame 12 of floor mount stand 10 in the side-by-side configuration with mounting plate 500 at the bottom height. Bent member 536 is inserted into hole 134 through second fold 122 of second side member 20 and bent member 538 is inserted into hole 138 through second fold 122 of second side member 20. Alternatively, bent member 530 is inserted into hole 134 through second fold 122 of second side member 20 and bent member 528 is inserted into hole 138 through second fold 122 of second side member 20. Mounting plate 1000 is connected to second side member 20 of floor mount stand 10 by a fastener, for example, a screw, that passes through hole 533 of tab 532 and a hole through side member 20 and a fastener, for example, a screw, that passes through hole 535 of tab 534 and a hole through second side member 20. Alternatively, mounting plate 1000 is connected to second side member 20 of floor mount stand 10 by a fastener, for example, a screw, that passes through hole 527 of tab 526 and a hole through side member 20 and a fastener, for example, a screw, that passes through hole 525 of tab 524 and a hole through side member 20.

Mounting plate 1000 is also connectable to frame 12 of floor mount stand 10 in the side-by-side configuration with mounting plate 500 on an opposite side between stud 700 and mounting plate 500. To connect mounting plate 1000 to first side member 18 of floor mount stand 10 at the top height, bent member 528 is inserted into hole 78 through first fold 74 of first side member 18 and bent member 530 is inserted into hole 80 through first fold 74 of first side member 18. Alternatively, bent member 538 is inserted into hole 78 through first fold 74 of first side member 18 and bent member 536 is inserted into hole 80 through first fold 74 of first side member 18. Mounting plate 1000 is connected to first side member 18 of floor mount stand 10 by a fastener, for example, a screw, that passes through hole 525 of tab 524 and hole 52 through first side member 18 and a fastener, for example, a screw, that passes through hole 527 of tab 526 and hole 60 through first side member 18. Alternatively, mounting plate 1000 is connected to first side member 18 by a fastener, for example, a screw, that passes through hole 535 of tab 534 and hole 52 through first side member 18 and a fastener, for example, a screw, that passes through hole 533 of tab 532 and hole 60 through first side member 18.

To connect mounting plate 1000 to first side member 18 of floor mount stand 10 at the middle height, bent member 528 is inserted into hole 82 through first fold 74 of first side member 18 and bent member 530 is inserted into hole 84 through first fold 74 of first side member 18. Alternatively, bent member 538 is inserted into hole 82 through first fold 74 of first side member 18 and bent member 536 is inserted into hole 84 through first fold 74 of first side member 18. Mounting plate 1000 is connected to first side member 18 of floor mount stand 10 by a fastener, for example, a screw, that passes through hole 525 of tab 524 and a hole through first side member 18 and a fastener, for example, a screw, that passes through hole 527 of tab 526 and a hole through first side member 18. Alternatively, mounting plate 1000 is connected to first side member 18 by a fastener, for example, a screw, that passes through hole 535 of tab 534 and a hole through first side member 18 and a fastener, for example, a screw, that passes through hole 533 of tab 532 and a hole through first side member 18.

To connect mounting plate 1000 to first side member 18 of floor mount stand 10 at the bottom height, bent member 528 is inserted into hole 86 through first fold 74 of first side member 18 and bent member 530 is inserted into hole 88 through first fold 74 of first side member 18. Alternatively, bent member 538 is inserted into hole 86 through first fold 74 of first side member 18 and bent member 536 is inserted into hole 88 through first fold 74 of first side member 18. Mounting plate 1000 is connected to first side member 18 of floor mount stand 10 by a fastener, for example, a screw, that passes through hole 525 of tab 524 and a hole through first side member 18 and a fastener, for example, a screw, that passes through hole 527 of tab 526 and a hole through first side member 18. Alternatively, mounting plate 1000 is connected to first side member 18 by a fastener, for example, a screw, that passes through hole 535 of tab 534 and a hole through first side member 18 and a fastener, for example, a screw, that passes through hole 533 of tab 532 and a hole through first side member 18.

Figure 12:
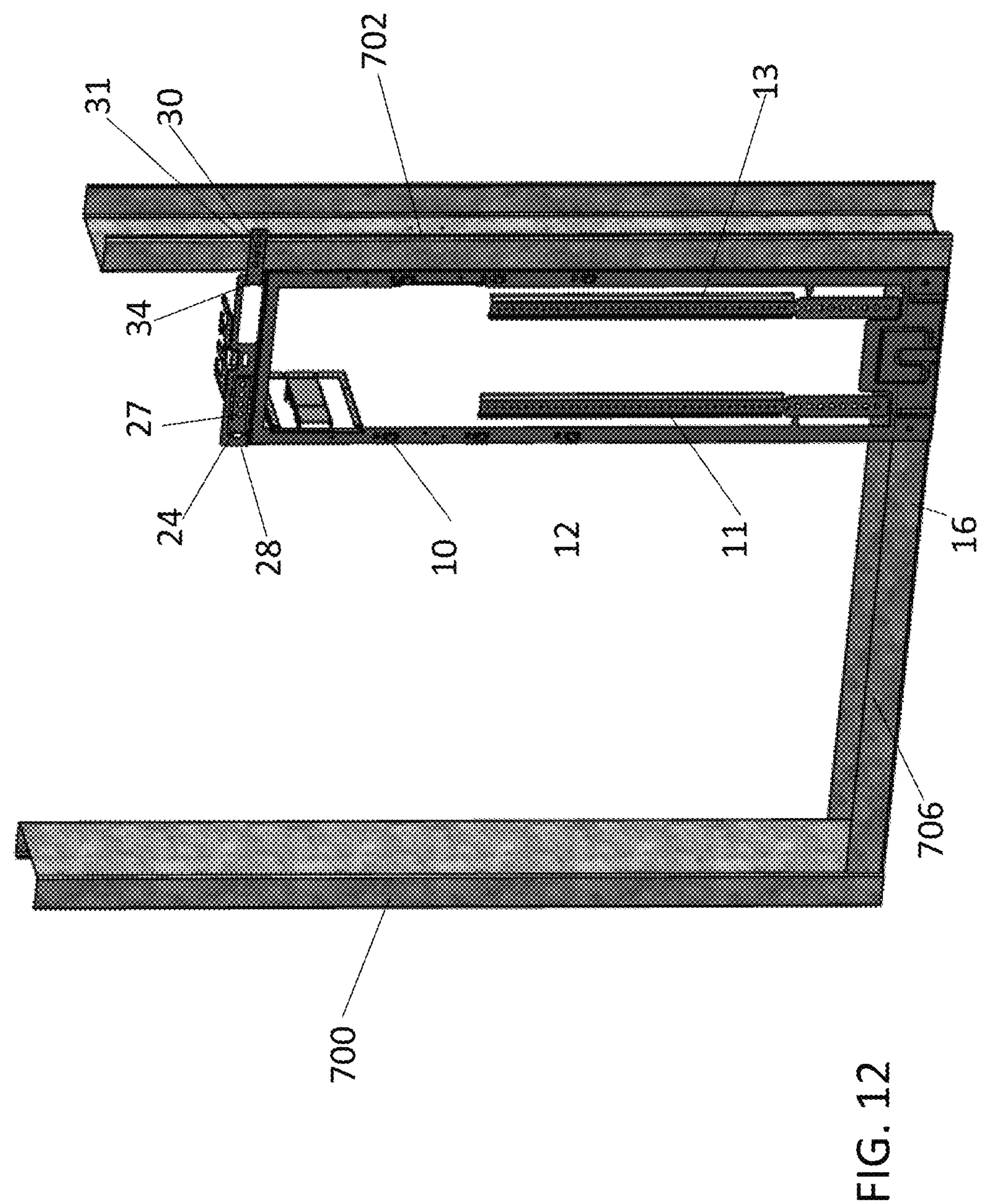
FIG. 12 is a front perspective view of the floor mount stand of FIG. 1 connected to one of the two studs and the track.

Referring to FIG. 12, floor mount stand 10 is connectable adjacent stud 702 without using the brace assembly of second brace piece 13 that is inserted in first brace piece 11. Bottom member 16 of frame 12 is connected to the outside surface or the inside surface of track 706 the same as described herein in reference to FIG. 7. Second foldable tab 30 is foldable about end 34 outward in the second direction to be positioned on stud 702. A fastener, for example, a screw, that passes through one of holes 31 through second foldable tab 30 and stud 702 connecting second foldable tab 30 to stud 702. Alternatively, floor mount stand 10 is connectable adjacent stud 700 by connecting bottom member 16 of frame 12 to the outside surface or the inside surface of track 706 the same as described herein in reference to FIG. 7 and first foldable tab 24 is foldable about end 28 outward in the first direction to be positioned on stud 700. A fastener, for example, a screw, that passes through one of holes 27 through first foldable tab 24 and stud 700 connecting first foldable tab 24 to stud 700. First brace piece 11 and second brace piece 13 can stay connected to frame 12 as shown in FIG. 12.

Advantageously, floor mount stand 10 comes with a break away adjustable brace comprising first brace piece 11 and second brace piece 13. This brace comprising first brace piece 11 and second brace piece 13 snaps in position adjacent top member 14 of floor mount stand 10 and it is fully adjustable. The brace comprising first brace piece 11 and second brace piece 13 is able to extend to the adjacent vertical studs 700, 702 allowing it to fully secure floor mount stand 10 and stop the movement. The integrated adjustable brace is made out of two channel type pieces, namely, first brace piece 11 and second brace piece 13. The smaller channel of second brace piece 13 gets inserted in the outer channel of first brace piece 11 having as a result a very strong adjustable assembly. The fact that the brace comprising first brace piece 11 and second brace piece 13 snaps in position adjacent top member 14 of floor mount stand 10, makes it a hands free installation.

Accordingly, floor mount stand 10 can mount electrical boxes in between studs at a particular height. Floor mount stand 10 can be attached to the floor and secured at the top. Floor mount stand 10 allows for variability of the position of the electrical box while connected to floor mount stand 10.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims

PARTS LIST

| | | |
|---|---|---|
| floor mount stand 10 | first hook 44 | slider portion 146 |
| first brace piece 11 | second hook 46 | holes 148 |
| second brace piece 13 | breakable member 47 | U-shaped member 150 |
| frame 12 | third hook 48 | bendable member 152 |
| top member 14 | indicia 49 | U-shaped member 154 |
| bottom member 16 | first support member 50 | bendable member 156 |
| first side member 18 | breakable member 51 | first segment 158 |
| second side member 20 | Holes 52, 54, 56, 58, 60, 62, 64, 66, 67, 68, 70 | second segment 160 |
| opening 22 | | mounting plate 500 |
| first foldable tab 24 | holes 53, 55 | plate body 502 |
| free end 26 | first fold 74 | center opening 504 |
| holes 27 | first cutout 76 | mounting holes 506, 508, 510, 512, 514 |
| end 28 | holes 78, 80, 82, 84, 86, 88 | mounting grooves 516, 518, 520 |
| second foldable tab 30 | fourth hook 90 | ridge 522 |
| holes 31 | fifth hook 92 | tabs 524, 526 |

-continued

| PARTS LIST | | |
|---|---|---|
| free end 32 | sixth hook 94 | hole 525, 527 |
| aperture 33 | second support member 96 | bent members 528, 530 |
| end 34 | breakable member 98 | tabs 532, 534 |
| middle tab 35 | holes 100, 102, 104, 106, 108, | hole 533, 535 |
| first side 36 | 110, 112, 114, 116, 118 | bent members 536, 538 |
| second surface 37 | second fold 122 | extended portion 540 |
| cable support 38 | second cutout 124 | first portion 541 |
| slots 39a | holes 126, 128, 130, 132, 134, 136 | second portion 543 |
| tabs 39b | side portion 138 | holes 542, 544 |
| upside-down U-shape flap 40 | slider portion 142 | cutout 546 |
| foldable strip 41 | side portion 144 | |
| track support 42 | | |
| breakable member 43 | | |
| extended portion 548 | | |
| holes 550, 552 | | |
| first portion 551 | | |
| second portion 551 | | |
| cutout 554 | | |
| above cutout 554 and a below | | |
| cutout 554 | | |
| vertical studs 700, 702, | | |
| electrical box 704 | | |
| track 706 | | |
| length L | | |
| sidewall 708 | | |
| mud ring 710 | | |
| screw 712 | | |
| hole 714 | | |
| screw 716 | | |
| hole 718 | | |
| second mounting plate 1000 | | |
| second electrical box 1002 | | |
| second mud ring 1004 | | |
| hole 1006 | | |
| groove 1008 | | |

What is claimed is:

1. A floor mount stand that is connectable to an electrical box comprising:

a frame connectable to the electrical box to support the electrical box on a floor; and a brace assembly having a first brace piece and second brace piece, the first brace piece and the second brace piece each being removably connected to the frame by a plurality of breakable members, the first brace piece and the second brace piece each being separated from the frame by breaking the plurality of breakable members, the first brace piece and the second brace piece that have been separated from the frame being movable relative to one another to adjust a length of the brace assembly, and each of the first brace piece and the second brace piece that have been separated from the frame are connectable to the frame by snap fit and the first brace piece extends to a first stud and the second brace piece extends to a second stud.

2. The floor mount stand of claim 1, wherein the frame has a top member opposite a bottom member that are connected by a first side member and a second side member to surround an opening.

3. A floor mount stand that is connectable to an electrical box comprising:

a frame connectable to the electrical box to support the electrical box on a floor; and a brace being removably connected to the frame, the brace being connectable to the frame so that the brace extends to adjacent vertical studs, wherein the frame has a top member opposite a bottom member that are connected by a first side member and a second side member to surround an opening, and wherein the frame has a first foldable tab that is foldable outward in a first direction and formed in the top member with a first free end opposite a first end that is connected to the frame, wherein the frame has a second foldable tab the is foldable outward in a second direction that is opposite the first direction and formed in the top member with a second free end opposite a second end that is connected to the frame, and wherein the first foldable tab and the second foldable tab are each connectable to one of the adjacent vertical studs to use the floor mount stand without using the brace.

4. The floor mount stand of claim 2, wherein the frame has a middle tab that is bent outward from the top member to be on a first side of the floor mount stand.

5. The floor mount stand of claim 4, further comprising a cable support that extends from the top member with a plurality of slots between a plurality of tabs to receive cables.

6. The floor mount stand of claim 2, wherein the bottom member connects to a track, and wherein the track is connected to the adjacent vertical studs.

7. The floor mount stand of claim 2, wherein the first side member and the second side member each has a plurality of hooks at different heights.

8. The floor mount stand of claim 7, wherein the first side member has a first fold with a first plurality of holes and the second side member has a second fold with a second plurality of holes.

9. The floor mount stand of claim 4, wherein the first brace piece and the second brace piece each include a channel.

10. A floor mount stand that is connectable to an electrical box comprising:

a frame connectable to the electrical box to support the electrical box on a floor; and a brace being removably connected to the frame, the brace being connectable to the frame so that the brace extends to adjacent vertical studs, wherein the frame has a top member opposite a bottom member that are connected by a first side member and a second side member to surround an opening, wherein the frame has a middle tab that is bent outward from the top member to be on a first side of the floor mount stand, wherein the brace is a brace assembly that has a first brace piece and a second brace piece that each include a channel, wherein the first brace piece has a first side portion that is flat and a first slider portion that has a flat section and folds on opposite sides that are bent outwards and inwards to form a C-shape forming a first channel and the second brace piece has a second side portion that is flat and a second slider portion that has a flat section and folds on opposite sides that are bent outwards and inwards to form a C-shape forming a second channel that is smaller than the first channel.

11. The floor mount stand of claim 10, wherein the floor mount stand is a flat plate that is cut and then a punch is applied to the first brace piece and the second brace piece to form the C-shape for each of the first slider portion and the second slider portion.

12. The floor mount stand of claim 10, wherein the C-shape of each of the first slider portion and the second slider portion has a width in an open portion of the C-shape that is larger than a base portion of each of the first slider portion and the second slider portion allowing the punch to be withdrawn after forming the C-shape.

13. A floor mount stand that is connectable to an electrical box comprising:

a frame connectable to the electrical box to support the electrical box on a floor; and a brace being removable connected to the frame, the brace being connectable to the frame so that the brace extends to adjacent vertical suds, wherein the frame has a top member opposite a bottom member that are connected by a first side member and a second side member to surround an opening, wherein the first side member and the second side me second side member each has a support member, and wherein each support member has a U-shaped member that extends into the opening and a bendable member that extends from a middle section of the U-shaped member so that each of the U-shaped members bend outward to a first depth and each of the bendable members bend outward further to a second depth that is greater than the first depth.

14. The floor mount stand of claim 8, further comprising a mounting plate that is connectable to the electrical box and the frame, and wherein the mounting plate has a plate body with a center opening through the plate body, a plurality of mounting holes and/or grooves through plate body, a plurality of tabs and a plurality of bent members extending from a first side and a second side opposite the first side of the plate body, and an extended portion extending from a third side between the first side and the second side.

15. The floor mount stand of claim 9, wherein the second brace piece is inserted in the first brace piece allowing the first brace piece and the second brace piece to slide relative to one another as a brace assembly, and wherein the first brace piece and the second brace piece to slide relative to one another to adjust a length of the brace assembly.

16. A floor mount stand that is connectable to an electrical box comprising:

a frame connectable to the electrical box to support the electrical box on a floor; and a brace being removably connected to the frame, the brace being connectable to the frame so that the brace extends to adjacent vertical studs, wherein the frame has a top member opposite a bottom member that are connected by a first side member and a second side member to surround an opening, wherein the frame has a middle tab that is bent outward from the top member to be on a first side of the floor mount stand, wherein the brace is a brace assembly that has a first brace piece and a second brace piece that each include a channel, wherein the second brace piece is inserted in the first brace piece allowing the first brace piece and the second brace piece to slide relative to one another as the brace assembly, and wherein the first brace piece and the second brace piece slide relative to one another to adjust a length of the brace assembly, wherein the first side member has a first fold and the second side member has a second fold, wherein the brace assembly is insertable between the middle tab extending from the top member, a first cutout in the first fold of the first side member, and a second cutout in the second fold of the second side member by a snap fit to hold the brace assembly against the top member of frame.

17. The floor mount stand of claim 16, wherein the first brace piece has a first side portion that can be positioned on a first stud of the adjacent vertical studs and a first fastener passes through the first side portion and through the first stud to connect first brace piece to the first stud and the second brace piece has a second side portion that can be positioned on a second stud of the adjacent vertical studs and a second fastener passes through the second side portion and through the second stud to connect second brace piece to the second stud.

18. The floor mount stand of claim 14, wherein the mounting plate fits in one or more of the plurality of hooks to maintain the mounting plate connected to the first side member and the second side member while a first fastener passes through the mounting plate and the first side member and a second fastener passes through the mounting plate and the second side member connecting the mounting plate to the frame.

19. The floor mount stand of claim 18, wherein the mounting plate is a first mounting plate that is connected to the electrical box that is a first electrical box, wherein the frame is connectable to a second mounting plate so that the first mounting plate and the second mounting plate are connected to the frame in a side-by-side configuration, and wherein the second mounting plate is rotated 90 degrees as compared to the first mounting plate that is connected to the first electrical box.

20. A floor mount stand that is connectable to an electrical box comprising:

a frame connectable to the electrical box to support the electrical box on a floor;

a brace being removably connected to the frame, the brace being connectable to the frame so that the brace extends to adjacent vertical studs; and a mounting plate that is connectable to the electrical box and the frame, and wherein the mounting plate has a plate body with a center opening through the plate body, a plurality of mounting boles and/or grooves through plate body, a plurality of tabs and a plurality of bent members extending from a first side and a second side opposite the first side of the plate body, and an extending portion extending from a third side between the first side and the second side, wherein the frame has a top member opposite a bottom member that are connected by a first side member and a second side member to surround an opening, wherein the first side member and the second side member each has a plurality of hooks at different heights, wherein the first side member has a first hold with a first plurality of holes and the second side member has a second fold with a second plurality of holes, wherein the mounting plate fits in one or more of the plurality of hooks to maintain the mounting plate connected to the first side member and the second side member while a first fastener passes through the mounting plate and the first side member and a second fastener passes through the mounting plate and the second side member connecting the mounting plate to the frame, wherein the mounting plate is a first mounting plate that is connected to the electrical box that is a first electrical box, wherein the frame is connectable to a second mounting plate so that the first mounting plate and the second mounting plate are connected to the frame in a side-by-side configuration, and wherein the second mounting plate is rotated 90 degrees as compared to the first mounting plate that is connected to the first electrical box, wherein, to connect the second mounting plate to the first side member or the second side member, each of a plurality of bent members of the second mounting plate is inserted into one of the plurality of holes through the first fold of the first side member or one of the plurality of holes through second fold of second side member and a fastener is inserted through the second mounting plate and the first side member or the second side member.

* * * * *